United States Patent Office 2,893,181
Patented July 7, 1959

2,893,181

HYDROGEN ELIMINATION IN TREATMENT OF METALS

William P. Burroughs, Bristol, Conn., assignor to General Motors Corporation, Detroit, Mich., a corporation of Delaware No Drawing. Application May 23, 1956
Serial No. 586,883

7 Claims. (Cl. 51—282)

This invention relates to the elimination of hydrogen during the treatment of metals and particularly to a method of removing hydrogen that is produced when metal members are tumbled over each other in an aqueous solution.

When iron or steel parts are tumbled or abraded upon each other in a closed chamber and in the presence of finely divided abrasive, water and other ingredients, there is usually a hazardous build-up of high gas pressure within the chamber which often becomes dangerous. It has been found that the gas produced during such a tumbling operation is very inflammable and occasionally this gas has caused damaging explosions. The metal parts subjected to such a tumbling operation in the presence of this high gas pressure have been found to undergo a physical change during tumbling and have become much more brittle than they were prior to the tumbling operation. An analysis of the gases produced during such a tumbling operation have clearly indicated that the principal gas present is hydrogen and that traces of hydrides may also be present. The fresh exposure of a bare unoxidized metal surface as caused by an abrading, tumbling, or even by an electrolytic action results in a very strong reducing action upon any water which it may contact. This reducing action causes the metal to combine with the oxygen of the water forming a metal oxide while at the same time releasing nascent or atomic hydrogen usually designated as H. This action not only occurs with iron and steel but also with other metals which are above hydrogen in the electromotive series of elements such, for example, as zinc, magnesium, aluminum, etc.

It is recognized that even in a dense metal such as iron or steel, this metal actually has lattice structure which contains minute interstices that may receive or absorb the atomic hydrogen as it is formed. This atomic hydrogen has the smallest atomic volume of any known element and may easily enter into the fine lattice structure of steel or other dense metal.

Atomic hydrogen, frequently referred to as monatomic hydrogen, usually exists only momentarily in the form of H and very readily combines with other hydrogen atoms to form the usual molecular hydrogen gas commonly known as $H_2$. When hydrogen atoms combine within the crystal lattice structure of the metal, heat is released thereby generating extremely high gas pressures within the metal. If this metal is already under sufficient stress, the crystalline lattice structure may open up to form a rift which usually releases more of the absorbed hydrogen and exerts added pressure causing cracks in the metal. These cracks if near the surface may break out as blisters, or if the steel or other metal is subjected to stresses and strains as may easily occur, cracks and breaks in the metal may result. If iron or steel containing hydrogen is subjected to a stress such as would normally cause a mere bending of the metal in a hydrogen-free iron, this deformation may easily permit the absorbed hydrogen within the lattice structure to cause the metal to break.

This absorbed hydrogen condition is often referred to as hydrogen embrittlement. Heretofore, it has been frequent practice to attempt to reduce this hydrogen embrittlement by an annealing or prolonged heating of the metal in an endeavor to at least partially relieve these injurious stresses and strains caused by the molecular hydrogen which exists under pressure within the structure of the metal. However, in spite of the time-consuming and expensive annealing operations, it is usually recognized that such a treatment fails to completely eliminate the dangers of hydrogen embrittlement.

It is, therefore, an object of this invention to provide an improved method whereby hydrogen is prevented from entering the lattice structure of a metal during an abrading or other treatment operation on the metal.

It is a further object to provide an improved treatment or method whereby nascent or atomic hydrogen emitted in the presence of a metal is taken up in chemical combination before the hydrogen may affect the metal.

A further object resides in the provision of an oxidizing environment in an aqueous solution used in an abrading or tumbling operation and which has a greater affinity for the liberated atomic hydrogen than has the metal being tumbled.

A still further object resides in the provision of a chemical treatment within a closed tumbling barrel during a tumbling operation which takes up the emitted hydrogen and prevents high gas pressures within the tumbling barrel.

To these ends and also to improve generally upon processes and methods of this character, this invention consists in the various matters hereinafter described and claimed. In its broader aspects, the invention is not necessarily limited to the specific examples hereinafter set forth for the purposes of illustration.

In the tumbling of iron or steel parts in tumbling barrels in the presence of even small amounts of water, it has been found that the freshly abraded metal has a very high reduction potential and reacts with the water to produce ferrous oxide and hydrogen. This hydrogen is released in its atomic or nascent form which enters the finely divided crystal lattice structure of the steel or iron. The ferrous oxide is hydrated by the water to form ferrous hydroxide which in turn may react with water forming ferric hydroxide and releasing more atomic hydrogen which is also free to enter the lattice structure of the metal thereby increasing the dangers of hydrogen embrittlement of the metal. These reactions may be set forth as follows:

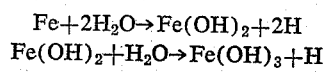

$$Fe + 2H_2O \rightarrow Fe(OH)_2 + 2H$$
$$Fe(OH)_2 + H_2O \rightarrow Fe(OH)_3 + H$$

To prevent the entrance of this nascent or atomic hydrogen into the crystal lattice of the steel and thereby avoid the dangers of hydrogen embrittlement in the steel, I have found that an oxidizing agent may be employed to rapidly take up the hydrogen as fast as it is formed and before this hydrogen has opportunity to enter into the structure of the steel. There are many oxidizing agents which readily combine with atomic hydrogen, but it has been found that an oxidizing agent for this particular purpose must have the special characteristics of being safe to use and without detrimentally affecting the steel or other metal being treated. For example, free oxygen might be used to combine with and take up the atomic hydrogen. However, oxygen is dangerous to use because its use under pressures can easily lead to explosions in the presence of combustible materials. Furthermore, under some conditions, oxygen could be detrimental to the metal being treated in the tumbling or other abrading operation. As a result of extensive experiments and tests, I have found that a desirable oxidizing agent used for this purpose may be of the class of an alkali metal or ammonium salt of a nitrogen-containing oxidizing acid.

Sodium nitrite or sodium nitrate added in suitable amounts to the aqueous solution in a tumbling barrel have been found to be very effective and inexpensive compounds for taking up the atomic hydrogen within a tumbling barrel and for preventing hydrogen embrittlement of iron and steel members subjected to an abrading or tumbling operation. Sodium nitrite has proved effective when it was added in the amount of eight ounces per gallon to the water in the tumbling barrel. During a tumbling operation, this sodium nitrite immediately reacts with the atomic hydrogen as it is formed thereby preventing the hydrogen from being absorbed by the steel or other metal being treated. This nitrite reacts with atomic hydrogen to form an unstable hyponitrite and water as shown in the following chemical reaction:

$$2NaNO_2 + 4H \rightarrow (NaNO)_2 + 2H_2O$$

Some of the unstable sodium hyponitrite hydrolyzes to form nitrous oxide which then reacts with hydrogen as follows:

$$(NaNO)_2 + H_2O \rightarrow N_2O + 2NaOH$$
$$N_2O + 2H \rightarrow N_2 + H_2O$$

The sodium hyponitrite additionally reacts with the hydrogen in one or both of the following two ways, by forming either sodium hydroxide and nitrogen or by forming sodium hydroxide and ammonia as indicated below:

$$(NaNO)_2 + 2H \rightarrow 2NaOH + N_2$$
$$(NaNO)_2 + 8H \rightarrow 2NaOH + 2NH_3$$

Simultaneously with these reactions, it is believed that hydroxylamine and hydrazine are formed as transients. However, these compounds are unstable in the presence of sodium hydroxide and usually break down to form nitrogen and ammonia as shown below:

$$3NH_2OH \rightarrow NH_3 + N_2 + 3H_2O$$
$$3N_2H_4 \rightarrow 4NH_3 + N_2$$

Whereas eight ounces of sodium nitrite per gallon of water appears to be sufficient, it is to be noted that other amounts of sodium nitrite may be used, it simply being necessary that sufficient sodium nitrite be present to immediately take up the atomic hydrogen as it is formed and before it has opportunity to enter into the metal being abraded or tumbled. It will be appreciated that other alkali metal nitrites may be employed for the same purpose. Repeated tests have shown with the employment of sodium nitrite as an oxidizing agent that gas pressure within a tumbling barrel has been reduced far below any dangerous level and down to less than one-third of the pressure encountered when no oxidizing agent was used. Gas analysis proved that no hydrogen was present upon completion of the tumbling operation whenever sufficient sodium nitrite was used.

Sodium nitrate has also been found to comprise a very satisfactory oxidizing agent for reacting with the atomic hydrogen as released during a tumbling operation upon iron or steel members in the presence of aqueous solution. Sodium nitrate has the further advantage of completely eliminating the development of gas pressure within a closed tumbling barrel thus indicating that detrimental gases such as atomic hydrogen are not present to injuriously affect the metal parts being treated. No gas analysis was performed upon the contents of the tumbling barrel when sodium nitrate was used since in repeated tests it was found that in a tumbling operation of steel parts within a sealed tumbling barrel, a vacuum of three to five inches of mercury was created. This condition of partial vacuum occurs soon after the start of the tumbling operation when either sodium nitrite or sodium nitrate is used as the principal oxidizing agent. This vacuum is caused by the oxygen from the air in the closed barrel combining with hydrogen to form water.

However, this partial vacuum was maintained during the entire tumbling operation only when sodium nitrate is the principal oxidizing agent. This results from the fact that with the use of sodium nitrate, the principal reduction product is ammonia wihch is absorbed by the water present and there are substantially no other gases formed to create gas pressure within the tumbling barrel. The important difference in the end products produced arises from the lower activity of sodium nitrate in reacting with atomic hydrogen as compared with the very much greater reactivity of sodium nitrite with atomic hydrogen. Sodium nitrate, when employed as the oxidizing agent, first reacts with the atomic hydrogen to form sodium nitrite and water as follows:

$$NaNO_3 + 2H \rightarrow NaNO_2 + H_2O$$

Due to this much greater reactivity of the sodium nitrite with atomic hydrogen, this nitrite is immediately further reduced to the final reduction products of ammonia, sodium hydroxide, and water, the intermediate steps of which have been previously explained.

$$NaNO_2 + 6H \rightarrow NaOH + NH_3 + H_2O$$

Hence, due to this difference in reaction rate, there can be substantially no sodium nitrite available in excess during this reaction when sodium nitrate comprises the principal oxidizing agent. This sufficient and controlled small amount of sodium nitrite present contrasts strongly with the situation wherein sodium nitrite comprises the principal and initial oxidizing agent. When sodium nitrite is the principal oxidizing agent, it is at first available in large excess and this very active oxidizing environment prejudices the formation of sodium hyponitrite, nitrous oxide and nitrogen instead of ammonia. Nitrous oxide and nitrogen are not readily absorbed by any aqueous solution within the tumbling barrel and thus can produce gas pressure within the sealed tumbling barrel.

In the tumbling of steel parts in aqueous solution within a closed tumbling barrel and wherein hydrogen is produced during the tumbling operation in the absence of an oxidizing agent, it has been noted that the surface of the steel upon which the hydrogen is being formed, becomes pitted even though the pH of the tumbling solution may be as high as 12. In this condition of strong alkalinity, it is generally believed that pitting does not occur. It appears that the atomic hydrogen formed may act during such a tumbling operation to localize the attack on the surfaces of the steel with a resultant increased liability to pitting. My method of using a nitrate, a nitrite or other suitable oxidizing agent having the required affinity for atomic hydrogen, has eliminated this pitting of metal when hydrogen is released on the metal surface during a metal treatment operation.

It should be understood that other oxidizing agents than those specifically mentioned may be effectively employed within the scope of my invention. For example, potassium permanganate, and sodium chromate, might be used. Thus, expressing the before-described pertinent compounds in ionic terminology, it is seen that any of the cations sodium, potassium, lithium (alkali metals) or ammonium, coupled with any of the anions nitrate, nitrite, permanganate, or chromate may be utilized in the invention. Sodium nitrite and sodium nitrate have been specifically described in their oxidizing reactions with atomic hydrogen since they are very effective, safe, easily obtainable and inexpensive as well as reliable to use.

I claim:

1. The method of abrading an article made of a metal which is above hydrogen in the electromotive series of elements comprising the steps of placing the article in contact with an aqueous medium, adding to said aqueous medium an oxidizing salt having a cation selected from the group consisting of ammonium, sodium, potassium and lithium ions and an anion selected from the group consisting of nitrate, nitrite, permanganate, and chromate ions, and abrading said metal article whereby the nascent hydrogen as formed from the reaction between the newly formed metal surface and the medium is oxidized to form water.

2. The method of abrading a ferrous metal article comprising the steps of locating the ferrous metal article in an aqueous medium, dissolving sodium nitrate in said medium in quantities of at least nine ounces of sodium nitrate per gallon of medium, and abrading said metal article whereby the hydrogen gas as formed from the chemical reaction between the freshly abraded metal surface and the medium is oxidized to water by the sodium nitrate.

3. The method of abrading ferrous metal members comprising the steps of placing a plurality of the members in a tumbling mill, adding an aqueous medium to said tumbling mill, dissolving at least eight ounces of sodium nitrite per gallon of medium in said tumbling mill as an oxidizing agent, and tumbling said members whereby the hydrogen as formed from the continuous reduction of water by the freshly exposed metal surface is oxidized to form water.

4. The method of abrading an article of a metal above hydrogen in the electromotive series comprising the steps of placing a plurality of said members in a tumbling mill, at least partially covering said members with an aqueous solution of sodium nitrate, and abrading said members by tumbling whereby the hydrogen gas as formed from the chemical reaction between the freshly exposed metal surfaces and molecules of water is oxidized to form water.

5. The method of abrading ferrous metal articles in a closed type tumbling mill comprising the steps of placing a plurality of ferrous metal articles in the tumbling mill, at least partially covering said articles with an aqueous medium, dissolving at least eight ounces of sodium nitrite per gallon of said medium, closing said tumbling mill, and tumbling said articles to polish their surfaces, whereby the nascent hydrogen chemically created during the reduction of water molecules by the continuously formed fresh metal surfaces is oxidized to form water.

6. The method of abrading the surface of a metal above hydrogen in the electromotive series while simultaneously preventing hydrogen absorption in said metal, comprising the steps of locating the metal in contact with an aqueous medium, dissolving potassium permanganate in said aqueous medium, and abrading said metal surface whereby the potassium permanganate oxidizes to water the hydrogen as formed from the continuous reduction of water by the freshly exposed metal surface.

7. The method of abrading metal articles subject to hydrogen embrittlement which comprises placing the articles in contact with an aqueous medium, adding to said medium an oxidizing salt having a cation selected from the group consisting of ammonium, sodium, potassium and lithium ions and an anion from the group consisting of nitrate, nitrite, permanganate and chromate ions, and abrading said articles while agitating said medium whereby the nascent hydrogen as formed from the reaction between the newly formed metal surface and the medium is oxidized to form water without embrittlement of the articles being abraded.

References Cited in the file of this patent

UNITED STATES PATENTS

| | | |
|---|---|---|
| 1,796,839 | Gravell et al. | Mar. 17, 1931 |
| 2,318,579 | Balz et al. | May 11, 1943 |